July 13, 1926.  1,592,139

I. HENNINGS

FISH BAIT OR LURE

Filed July 26, 1924

Ivar Hennings,
INVENTOR.

BY George J. Ottsch
ATTORNEY.

Patented July 13, 1926.

1,592,139

UNITED STATES PATENT OFFICE.

IVAR HENNINGS, OF SOUTH BEND, INDIANA.

FISH BAIT OR LURE.

Application filed July 26, 1924. Serial No. 728,326.

The invention relates to fishing lures of the type comprising a body, which body is preferably of the diving bait type wherein a cylindrical diagonally disposed cut or recess is carried by the forward end of the bait, which causes said bait to dive, dart and wobble, and to suspend a hook from the under side of the body forwardly of the transverse center of the body, and to mount a spinner on the shank of said hook, the resistance of which spinner and hook, when the bait is retrieved or reeled in, will tend to tilt the nose of the bait downwardly, thus causing the same to dive more quickly the moment reeling in begins. The spinner and hook also form means for causing the bait body to remain at a greater depth under a given speed of travel, and at the same time insures a more uniform wobbling action and reduces the possibility of the bait easily darting out of the water.

A further object is to provide the spinner with a convex forward end and to turn the hook upwardly, thereby preventing a collection of weeds on the spinner and hook, and providing a bait which will easily slide over weeds, reeds or rocks.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 3:
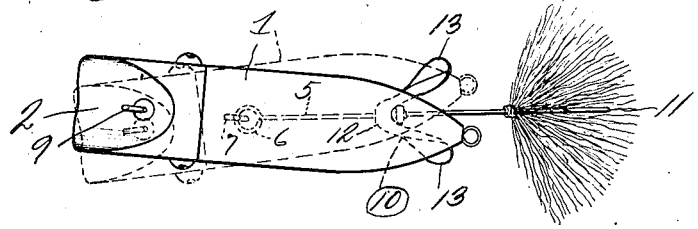
Figure 3 is a top plan view of the bait illustrating the wobbling action of the bait body.

Referring to the drawing, the numeral 1 designates the bait body, which body is of the type which dives during a reeling operation and wobbles incident to the resistance of water in the diagonally disposed concaved recess 2 in the forward end 3 of the bait, and which bait body is substantially the same construction as that set forth in Patent No. 1,209,641, December 19, 1916, issued to James S. Olds. It has been found that bait bodies of this particular construction have more or less an erratic darting and wobbling movement as the same turns on its longitudinal axis, and at times darts entirely out of the water during the reeling in operation. To steady the bait, and make the same have a more uniform wobbling action, and not easily dart out of the water, a hook 4 has its shank 5 provided with a transversely disposed eye 6, which extends through an eye 7 in a vertical longitudinal plane and carried by the under side of the body 1 forwardly of the transverse center of the bait body, therefore it will be seen that when, during a reeling operation a pull is imparted on the fish line 8, which is secured to the eye 9 in the recess 2, the hook 4 and the spinner 10 carried by the shank 5 will form a resistance against the water, which will tilt the forward end 3 of the bait body 1 downwardly, thereby insuring a diving action during the reeling in operation and steadying the bait body in its wobbling action, whereby it will wobble more uniformly. By providing the diving action immediately upon the reeling in operation, it is obvious that the possibility of the bait darting out of the water is reduced to a minimum. The wobbling action is shown in dotted and full lines in Figure 3 slightly exaggerated, to better illustrate the same, and it will be noted that the resistance of the spinner 10 in the water will tend to prevent too great a swerving of the bait, so that the wobbling action is practically uniform at all times. It will be seen that by disposing the spinner 10 beneath the bait body 1, the glimmer and agitation thereof may be seen by the fish from any point, which is not the case where spinners are mounted either on the nose or tail end of the body. Fish often strike at the spinner, and when they do and the spinner is mounted on the nose or tail end of the body, the bait is frequently shoved out of the way before the fish can come in contact with the hooks, which are entirely missed or the fish is unsecurely hooked. By disposing the spinner beneath the body and directly upon and adjacent the point of the hook, which are thus unobstructed by the bait body from any direction the fish may make a rush for the bait, the liability of the fish becoming hooked is materially enhanced. The diving action of the bait can also be varied and the wobbling action retained by varying the position of attaching the hook to the body 1 anywhere between its transverse center and the forward end thereof, for varying the line of pull on the line 8 in relation to the hook and spinner.

The hook 4 has its point upwardly disposed, therefore it will be seen that it will not catch in reeds, rocks or the like, or gather weeds. To prevent the spinner from catching weeds or hanging on rocks during a reeling in operation, the spinner has its hub portion 12 forwardly convexed and its blades 13 diverging rearwardly, therefore it will be seen that it will easily slide over obstructions during a reeling in operation, and will deflect weeds or grass away from the hook during the movement of the bait.

Figure 1:
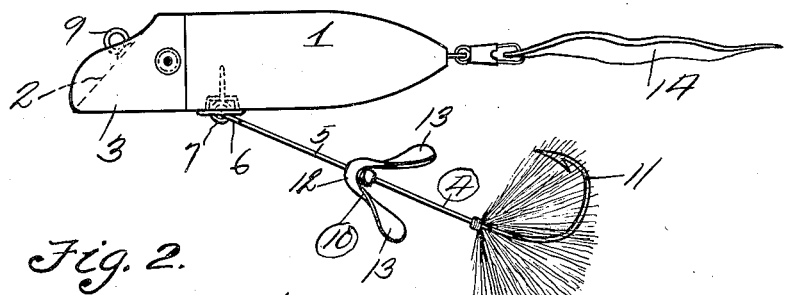
Figure 1 is a side elevation of the lure.
Figure 2:
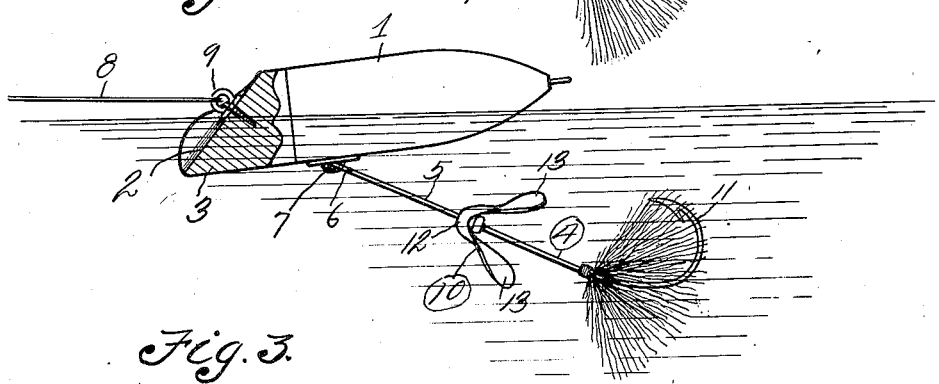
Figure 2 is a side elevation of the lure showing the same tilted during a retrieving or reeling operation.

If desired a piece of pork rind 14 may be attached to the rear end of the bait body 1 as shown in Figure 1, but it has been found that the bait may be effectively used without attaching anything to said end. However it is illustrated in Figure 1 to show how a member of any sort may be readily attached thereto which may be thought to enhance the attractiveness of the bait, such as a feather, bucktail or hackle decorated hook, or simply a piece of red flannel if desired.

From the above it will be seen that a fishing lure is provided of the diving and wobbling type, which will have a quick diving action immediately the reeling in operation begins, and the possibility of the bait darting out of the water reduced to a minimum. At the same time a substantially uniform wobbling action is insured, and the bait will be practically weedless.

The invention having been set forth what is claimed as new and useful is:—

1. The combination with a diving fish bait body, a fish line attached to the forward end of said bait body, of water resisting means for tilting said body downwardly at its forward end upon a pull on the fish line, said means comprising a hook suspended from the under side of the bait body between its transverse center and its forward end, and a spinner rotatably mounted on said hook and spaced from the body.

2. The combination with a bait body which dives upon a pull on a line attached to the forward end thereof, of water resisting means for tilting said body upon a pull on the line, said means comprising a member attached to the under side of the bait body between its transverse center and its forward end, and a spinner carried by said member and spaced from the bait body.

3. The combination with a bait body which dives upon a pull on a line attached to the forward end thereof, of water resisting means for tilting said body upon a pull on the line, said means comprising a hook, a shank carried by said hook, said shank being attached to the under side of the bait body between the transverse center thereof and the forward end of the bait body, a spinner mounted on said shank and disposed below the bait body, said spinner being forwardly convexed, the point of said hook being upwardly disposed.

In testimony whereof I affix my signature.

IVAR HENNINGS.